United States Patent [19]
Druckman et al.

[11] Patent Number: 6,164,477
[45] Date of Patent: Dec. 26, 2000

[54] COMBINED MORTISE AND TENON JOINT FEATURE

[75] Inventors: Ralph D. Druckman, Marysville; Richard C. Burnham, Kirkland; James S. Griffing, Mountlake Terrace; Chai Y. Indharasophang, Clyde Hill; Paul S. Dewar, Seattle; Marc A. Spane, Camano Island, all of Wash.; Tom F. Hodgman, Duesseldorf, Germany; Scott D. Button, Snohomish, Wash.

[73] Assignee: The Boeing Company, Seattle, Wash.

[21] Appl. No.: 08/974,948

[22] Filed: Nov. 20, 1997

[51] Int. Cl.$^7$ .................................................... B65D 6/18
[52] U.S. Cl. ................................. 220/7; 220/62; 220/6; 220/682
[58] Field of Search ............................... 220/6, 7, 592.25, 220/592.2, 62.18, 62.11, 62.22, 62, 1.5, 628, 682, 690, 691, 729

[56] References Cited

U.S. PATENT DOCUMENTS

| | | | |
|---|---|---|---|
| 3,330,437 | 7/1967 | Bellamy | 220/62 |
| 3,432,061 | 3/1969 | Anderson | 220/62 |
| 4,025,215 | 5/1977 | Murdock et al. | |
| 4,162,341 | 7/1979 | Norton | 220/592.25 |
| 4,175,884 | 11/1979 | Cheng | |
| 4,641,985 | 2/1987 | Bard et al. | |
| 4,797,020 | 1/1989 | Winston | |
| 4,867,598 | 9/1989 | Winter, IV | |
| 5,305,875 | 4/1994 | Meyer | 220/62 |

*Primary Examiner*—Stephen Castellano
*Attorney, Agent, or Firm*—Christensen O'Connor Johnson Kindness PLLC

[57] ABSTRACT

A one piece stowage bin (10) has a generally rectangular, polygonal open-fronted box-type structure. Right and left end panels (14) and (18) rise up from the sides of the bottom panel (12) to form side walls. Three fold lines allow the stowage bin (10) to comprise the rear lower panel (22), the rear upper panel (26) and the top panel (30) of the stowage bin. Tenons (51), (52), (53), (54), (57), (58), (59), and (60) extend from the margins of the right and left end panels (14) and (18). Mortise pockets (63), (64), (65), (66), (71), (72), (73), and (74) are formed in the side margins of the rear upper panel 26 and the top panel (30). The mortises and tenons create interlocking mortise and tenon joints that do not require a bonding adhesive. Right and left formed angle brackets (38) and (40) secure the right and left end panels (14) and (18) to the top panel (30). Rear upper panel edge margins (27) and (28) and the top panel edge margins (30) and (32) contain outwardly extended bulges in the region of the mortise pockets that define minimum edge margins around each mortise pocket. Right extending minimum edge margin bulges (81), (82), (83), and (84) are staggered relative to left extending minimum edge margin bulges (89), (90), (91), and (92). Protrusions (120) extend into the interior of the mortise pockets from the sidewalls thereof to extend into the interior of the mortise pockets. The protrusions are sized to form an interference fit with the tenon tabs through a combination of spring deflection of the protrusions by the tenon tabs and local material removal from the tips of the protrusions as the tenons are inserted.

10 Claims, 5 Drawing Sheets

COMBINED MORTISE AND TENON JOINT FEATURE

FIELD OF THE INVENTION

This invention relates to the field of building construction using mortise and tenon joints to connect structural members in aerospace commodities, and more particularly, to the use of minimum edge margin mortise and tenon joints which implement self tooling characteristics to produce overhead stowage bins for aircraft from a single folded composite sandwich panel.

BACKGROUND OF THE INVENTION

The practice of the aerospace industry has been to adapt long established carpentry methods of joinery into aerospace commodities in an attempt to capture the advantages of reduced weight and assembly complexity. Substantial difficulties have sometimes been encountered however, because tolerances achievable with fine carpentry in wood-working are far superior than that which can be achieved using many aerospace materials, such as composite honeycomb sandwich panel type structures, and their related assembly methods. Thus, time proven joinery techniques that have been effectively implemented in wood-working applications, have proved ineffectual in the aerospace industry.

One such problem area for aerospace applications, which has been encountered in the prior art, has been how to maximize the volume of a defined envelope using extended tab and pocket cutout joinery methods, while also maintaining maximum joint strength. The rabbet joint has become the standard design for the majority of aerospace commodities that utilize extended tab and pocket cutout joinery. In a rabbet joint, the pocket cutouts are at the very edge of the panel, with the pocket sidewalls actually incorporated into the outer edge of the panel. This type of joint permits joint location to occur at the edge of a panel, thus providing the benefit of a non-interfering edge profile. The disadvantage of the rabbet joint, is that the joint must be adhesive bonded to secure the panel connection, and the primary load path is through the relatively weak adhesive bondline at the rabbet joint.

The standard alternate to the rabbet joint is commonly referred to as a mortise and tenon joint. Although, the term mortise and tenon has become somewhat generic in fine carpentry uses, aerospace usage has defined a mortise and tenon joint as a term of art, describing a joint utilizing sandwich panel construction with square cut tabs (tenons) and blind (joint not visible after joining has occurred) slotted pocket cutouts (mortises), without dovetailing.

The bonding process of a mortise and tenon joint also involves applying adhesive into the mortise pocket; however, since the pocket is fully enclosed in the mortise panel (not incorporated into the panel edge as in the rabbet joint), the primary load path is through the mortise panel itself and not the adhesive bondline. The disadvantage of the mortise and tenon joint is the existence of an edge margin of the mortise panel that extends from the mortise pocket to the actual edge of the panel. This interfering edge margin reduces the volume which can be achieved inside a defined envelope. It is desirable to have a joint that would provide the combined benefits of both a rabbet joint and a mortise and tenon joint.

Another unresolved problem in the prior art is that although tight tolerance control of the standard square cut mortise (panel hole) can be achieved through the use of NC panel and profile routers, large clearances are still usually required between the tenon tabs and mortise cutout sidewalls, in order to allow for variation in tenon panel thickness. The current state of the art in composite honeycomb sandwich panel production utilizes a multi-opening press (MOP) process, that does not presently afford a high degree of control of panel thickness variation.

Thus, relatively large clearances must be designed into mortise and tenon joint interfaces so that costly interference conditions do not occur, preventing the tenon tabs from fitting into the mortise pockets, and resulting in the scrapping of parts or expensive rework. These large clearances between the mortise pocket sidewalls and the tenon tab surfaces, increase the need for elaborate and expensive tooling to accurately locate and secure the panels. While the panels are held in place, an adhesive, which is used to bond the joint, is allowed the necessary time to cure. A joint structure with inherent self-tooling features that could eliminate the need for expensive additional tooling is highly desirable.

Still an additional unresolved problem in the prior art involves the efficient production of lightweight overhead stowage bins for aircraft. Currently, overhead stowage bins for aircraft are produced by joining together four (typically) composite sandwich panels using structural adhesives and either aluminum brackets fastened to potted inserts or modified box joints (typically rabbet joints). Both of these methods depend on the strength of the adhesives to carry the required structural loads.

This reliance on adhesives presents two major disadvantages. First, the loads that adhesives are typically capable of carrying are inferior to the loads that can be carried through the composite panels themselves. Second, adhesives present substantial manufacturing problems, in that parts must be jigged in the proper configuration while the adhesive cures; a time period generally of around eight hours. It is desirable to have a aircraft stowage bin that can be produced without structural adhesives.

SUMMARY OF THE INVENTION

The present invention discloses a one-piece aircraft overhead stowage bin constructed from a single piece of folded, thermoplastic-composite-skinned, honeycomb-cored sandwich panel. The aircraft stowage bin is formed by folding the composite material into a locking open box type structure. The composite sandwich panel contains interlocking joints which can be characterized as minimum edge margin mortise and tenon joints (described below).

A minimum edge-margin mortise and tenon joint corner structure is formed from a tenon panel, having tenon tabs, engaging mortise pockets formed in an angularly disposed tenon panel. In the minimum edge margin joint, the mortise pockets are located along the edge of the mortise panel, as in a rabbet joint, but with the mortise panel edge containing outwardly extended bulges in the regions of the mortise pockets, such that a minimum edge margin is maintained around each mortise pocket (instead of the pockets being incorporated into the panel edge as in a rabbet joint).

In a preferred embodiment of the present invention, the single piece thermoplastic composite honeycomb sheet is cut so that sections of the sheet can be folded, using a thermoplastic folding method, to form the stowage bin. Side portions of the sheet are designed such that their shape facilitates being folded upwards to form end panels of the stowage bin. Another portion of the sheet is designed such that its shape facilitates being folded upwards and then over, to form the top panel of the stowage bin.

The minimum edge margin mortise and tenon joints are used at the connection between the top edge of the end panels and the top panel of the stowage bin. The mortise pockets in the mortise portion of the panel joint, are located along the edge of the top panel of the stowage bin. The tenon tabs in the tenon portion of the panel joint are located along the top edge of the end panels. This allows the minimum edge margin mortise and tenon joints to engage during the folding process of the stowage bin panel.

Finally, two formed angle brackets are through-bolted to the top panel of the stowage bin and the end panels. This provides a load path for downloading forces and securely locks the bin together. This locking method, which utilizes the formed angle brackets, allows the folded composite panel to form joints that connect such that no adhesive is required, either to carry loading forces or to hold the bin together. The only direction in which the minimum edge margin mortise and tenon joint is subject to detachment during loaded conditions, is secured by the formed angle brackets.

Another aspect of the invention discloses a self aligning mortise and tenon joint structure that is formed from angularly arranged tenon and mortise panels, having tenon tabs and mortise pockets, respectively. In mortise and tenon joints constructed of composite honeycomb material, the mortise pockets in the mortise panel must be cut sufficiently larger than the optimal size of the extended tenon tab of the tenon panel, because of the inherent thickness variations in tenon panel production. Otherwise tenon panel thickness variation can cause an interference with the mortise pocket sidewalls, preventing the tenon tab from fitting in the mortise pocket.

In the self aligning mortise and tenon joints of the present invention, the mortise pocket sidewalls incorporate protrusions extending into the mortise pocket, the protrusions being distributed along the sidewalls of the mortise pocket. During the assembly process, the tenon tabs will deflect these unsupported protrusions slightly and/or remove material from the tips of the protrusions at the points of contact, forming an interference fit. The protrusions thus act as a self-locating/self tooling features both to locate the tenon in the center of the mortise, and so that if it is desired that bonding adhesive be used in the joint, the tenon panel is secured to the mortise panel until curing completion, without the assistance of additional tooling devices.

A stowage bin constructed in accordance with the present invention may thus be formed from only a single piece of folded thermoplastic-composite-skinned sandwich sheet and two formed angle brackets. The lack of requirement for bonding adhesive greatly reduces manufacture time, since the adhesive application and adhesive curing stages are eliminated from the assembly process. Weight savings are also acquired from the reduction in part count (both in brackets and panels). Further, the incorporation of the minimum edge margin mortise and tenon joints gives the combined benefits of the non-interference edge profile of a rabbet joint, with the superior strength of a traditional mortise and tenon joint. Additionally, this invention incorporates self-tooling features into the mortise pocket cutouts, that accommodate tenon panel thickness variations by a combination of local material removal and "spring" deflection of the unsupported protrusions to locate and maintain the tenon panel in the center of the mortise pocket cutout.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
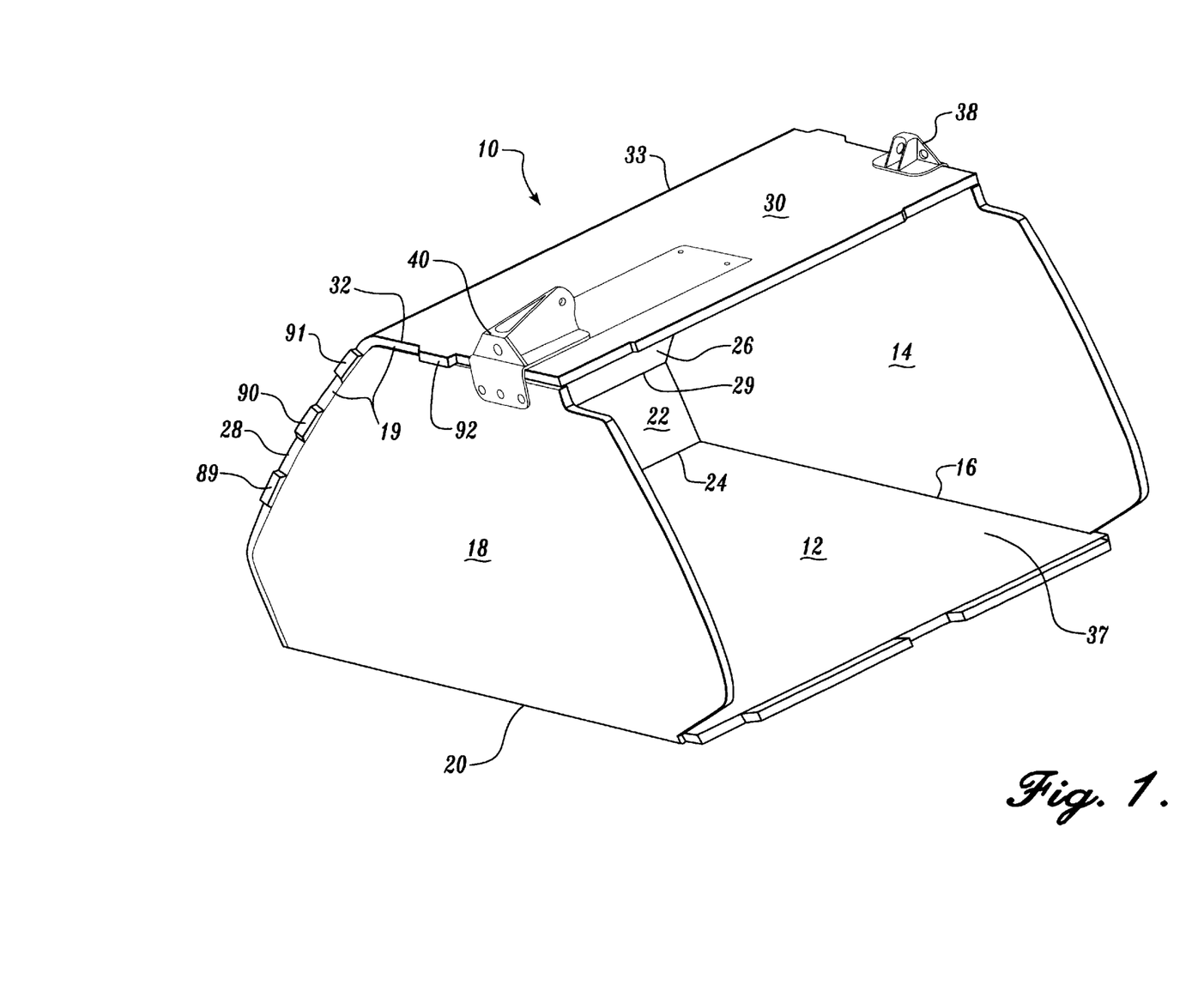
FIG. 1 illustrates a perspective view of a preferred embodiment of the present invention.

FIG. 1 illustrates a preferred embodiment of a one-piece aircraft stowage bin 10 constructed in accordance with the present invention and utilizing a folded composite sandwich panel and interlocking joints. The one piece stowage bin 10 has a bottom panel 12 which forms the bottom of the open box-type structure. Forming the side walls of the stowage bin 10 are right and left end panels 14 and 18 which rise up from the sides of the bottom panel 12. The remaining portion of the stowage bin 10 contains three fold lines which allow it to comprise the rear lower panel 22, the rear upper panel 26 and the top panel 30 of the stowage bin. It should be readily apparent that a greater or lesser number of rear panels could be utilized without departing from the general concept of the structure described herein.

Figure 2:
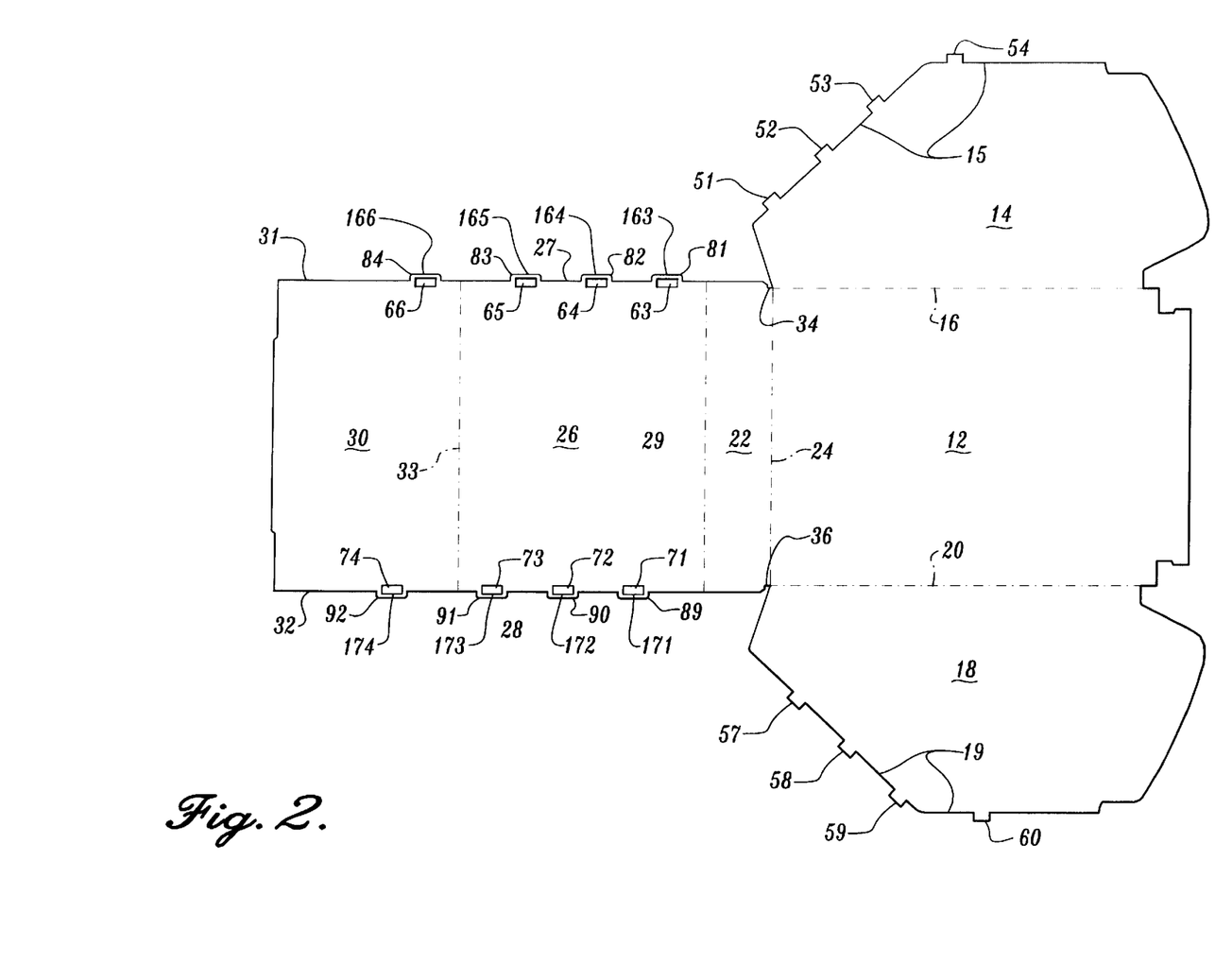
FIG. 2 illustrates a top view of the preferred embodiment of FIG. 1 showing the panel in a flat, pre-folded state.

FIG. 2 shows tenons 51, 52, 53, 54, 57, 58, 59, and 60, which extend from the margins of the right and left end panels 14 and 18. Mortises 63, 64, 65, 66, 71, 72, 73, and 74 respectively are formed in the side margins of the rear upper panel 26 and the top panel 30. Together, the mortises 63, 64, 65, 66, 71, 72, 73, and 74, and tenons 51, 52, 53, 54, 57, 58, 59, and 60, create interlocking joints. As shown in FIG. 1, right and left formed angle brackets 38 and 40 secure the right and left end panels 14 and 18 to the top panel 30.

Describing the present invention more specifically, the overhead stowage bin 10 is constructed from a single sheet of thermoplastic-composite-skinned, honeycomb-cored sandwich. The composite sandwich sheet is originally flat, as shown in FIG. 2. The sheet is then folded using a thermofolding process into its final shape as shown in FIG. 1. A preferred thermofolding technique is described in patent application Ser. No. 08/712,987, filed Sep. 13, 1996.

Referring to FIG. 2, the intended fold lines for the formation of the bin's final shape is illustrated. Between the right edge panel 14 and the bottom panel 12 is the right/bottom panel fold line 16. Correspondingly, between the left end panel 18 and the bottom panel 12 is the left/bottom panel fold line 20. Continuing, between the rear lower panel 22 and the bottom panel 12 can seen be the rear lower/bottom panel fold line 24. Next in line, between the rear upper panel 26 and the rear lower panel 22 can be seen the upper/lower panel fold line 29. Finally, between the top panel 30 and the rear upper panel 26 can be seen the top/upper panel fold line 33. In an alternate embodiment, the right and left end panel upper edges 15 and 19, could actually be fold lines where the right and left end panels 14 and 18 attached to the top panel 30. In this embodiment The preferred embodiment as shown in FIG. 2, also discloses a right rear lower/end panel intersection notch 34 and a left rear lower/end panel intersection notch 36. These notches in the rear lower panel 22 are located just before the rear lower/bottom panel fold line 24. The function of these notches is to prevent an interference condition from occurring when the right and left end panels 14 and 18 and the rear lower panel 22 are all folded upwardly. The right and left intersection notches 34 and 36 facilitate the formation of a corner joint between these three intersecting planar surfaces.

The shape of the completed overhead stowage bin 10 can be generally described as a rectangular, polygonal open-fronted box-type structure. Referring again to FIG. 1, it can be seen that the stowage bin 10 is generally rectangular when observed from a proximal (front) view of the open-fronted structure (right-hand side in FIG. 1). As can be more clearly seen in FIG. 3, the stowage bin 10 can also be described generally as an asymmetrical six-sided polygon. The forward or in board side of the stowage bin defines an opening 37 in the bin's completed final stage.

Referring again to FIG. 2, the interlocking joints of the stowage bin 10 are a modified-type of mortise and tenon joint described as minimum edge margin mortise and tenon joints. This joint is formed from the intersection of an orthogonally disposed tenon panel and mortise panel. The tenon panel is illustrated as having "square cut" tenon tabs and the mortise panel is illustrated as having "square cut" mortise pocket cutouts with no dovetailing or other angling cut utilized in the sides or edges of the tenon tabs or mortise pocket cutouts. On the aircraft stowage bin 10, four right end panel tenon tabs 51, 52, 53, and 54 are located along the right end panel upper edge 15. The four left end panel tenon tabs 57, 58, 59, and 60 are located on the left end panel upper edge 19.

In the minimum edge margin mortise and tenon joint of the present invention, the mortise pockets are located along the edge of the mortise panel as in a rabbet joint but with the mortise panel edge containing outwardly extended bulges in the region of the mortise pockets. This defines a minimum edge margin around each mortise pocket cutout instead of the mortise pocket sidewalls being incorporated directly into the panel edge as in a rabbet joint. An inherent advantage of the edge margin mortise and tenon joint of the present invention is that the load imposed on the joint extends through the minimum edge margin of the panel, instead of being forced through the bondline of an adhesive, which are commonly used to secure prior art joints. The panel together with the minimum edge margin can carry a substantially greater load than can an adhesive bondline.

Referring again to FIG. 2, the stowage bin 10 utilizes eight minimum edge margin mortise pockets, four on the right and four on the left. Specifically, in the present invention there are three minimum edge margin mortise pockets 63, 64, and 65 on the rear upper panel right edge margin 27 and one minimum edge margin mortise pocket 66 on the top panel right outer edge 31. Correspondingly, there are three minimum edge margin mortise pockets 71, 72, and 73 on the rear upper panel left edge margin 28 and one left top panel minimum edge margin mortise pocket 74 on the top panel left outer edge 32.

In the preferred embodiment of the present invention, the right side wall tenon tabs 51, 52, 53, and 54 and the left side wall tenon tabs 57, 58, 59, and 60 are disposed along on the right and left end panel upper edges 15 and 19 respectively, so that a lateral load is carried through the edge margins of the mortise pockets 63, 64, 65, 66, 71, 72, 73, and 74. Alternative embodiments of this invention may utilize a greater or lesser number of minimum edge margin mortise pockets depending on the loading requirements for the particular applications involved.

Since the tenon tabs are located on the upper edge portions of the end panels and the mortise pockets are located on the outer edge portions of the rear upper panel and the top panel, a limited number of folding sequences are needed to form the stowage bin 10. One preferred sequence is to first fold up the right and left end panels 14 and 18 along fold lines 16 and 20, and then fold the top panel 30, the rear upper panel 26 and rear lower panel 22 in that respective order. This particular folding sequence allows the mortise and tenons to engage together as the box structure is formed.

As can be seen by careful examination of FIG. 2, the right mortise pockets 63, 64, 65, and 66 and right tenon tabs 51, 52, 53, and 54 do not align symmetrically with the left mortise pockets 71, 72, 73, and 74 and the left end panel tenon tabs 57, 58, 59, and 60, but rather are staggered relative to each other. This design allows two identical stowage bins (or indeed an entire row of stowage bins) to nest in close proximity to one another with the right extending minimum edge margin bulges 81, 82, 83, and 84 forming a "zipper-like" connection with the left extending minimum edge margin bulges 89, 90, 91, and 92 of an identical adjacent bin.

The outer longitudinal sidewalls 163, 164, 165, and 166 are the longitudinal sidewalls of the right mortise pockets 63, 64, 65, and 66 that are the closest to the rear upper panel right edge margin 27 and the top panel right edge margin 31. In a preferred embodiment, the outer longitudinal sidewalls 163, 164, 165, and 166 are in linear alignment with the rear upper panel right edge margin 27 and the top panel right edge margin 31, with only the right minimum edge margin bulges 81, 82, 83, and 84 extending beyond the right panel edge margins 27 and 31. This type of minimum edge margin mortise and tenon joint design allows the volume of the stowage bin 10 to be maximized.

Correspondingly, the outer longitudinal sidewalls 171, 172, 173, and 174 are the longitudinal sidewalls of the left mortise pockets 71, 72, 73, and 74 that are the closest to the rear upper panel left edge margin 28 and the top panel left edge margin 32. In a preferred embodiment, the outer longitudinal sidewalls 171, 172, 173, and 174 are in linear alignment with the rear upper panel left edge margin 28 and the top panel left edge margin 32, with only the left minimum edge margin bulges 89, 90, 91, and 92 extending beyond the left panel edge margins 28 and 32. Alternative embodiments of this invention might vary the location and alignment of the mortise pockets along the panel edge margins and with respect to the pocket's respective minimum edge margin bulges to accommodate specific applications.

Figure 3:
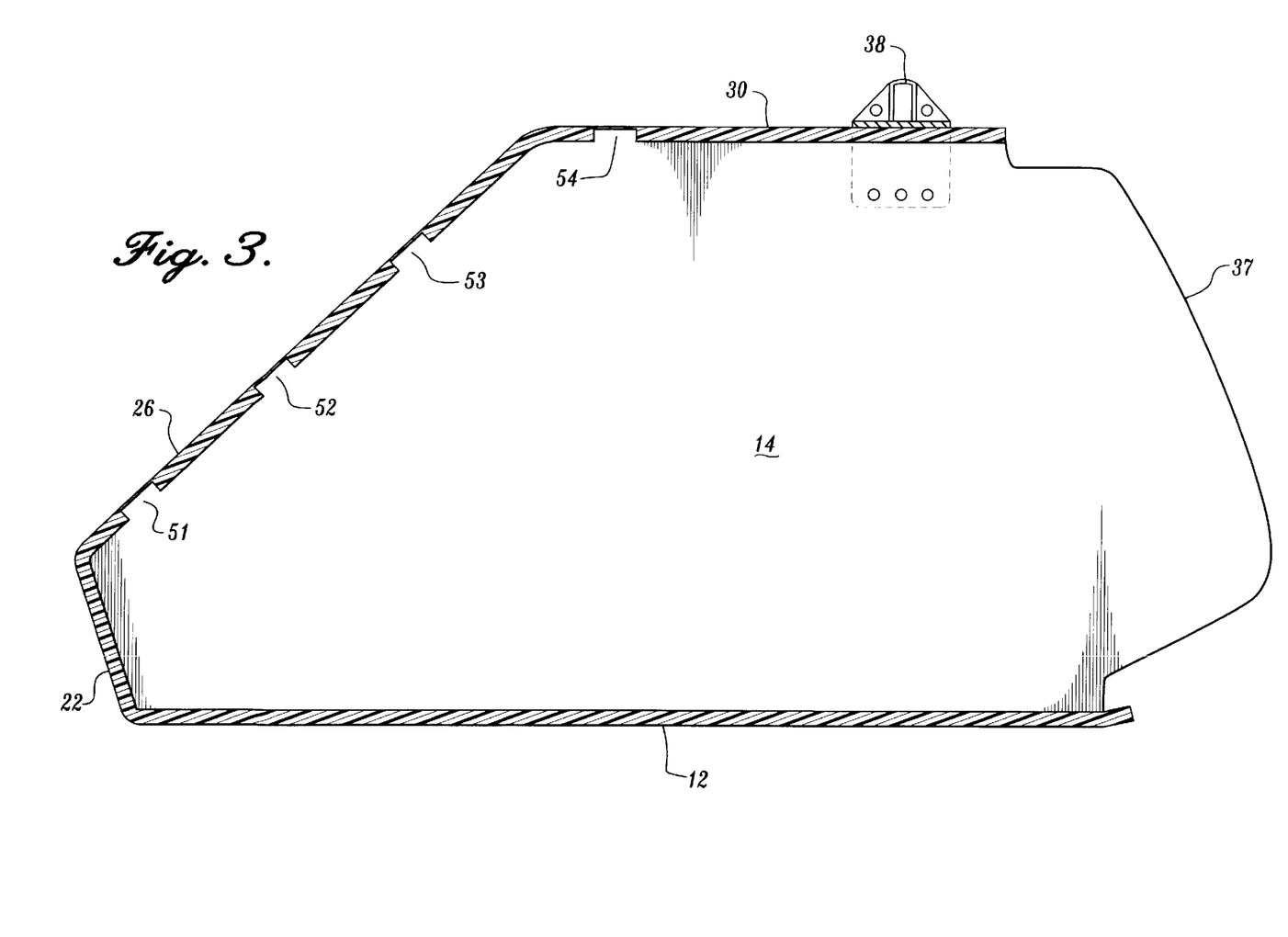
FIG. 3 illustrates a side view of the preferred embodiment of FIG. 1 showing the stowage bin fully folded.

Referring to FIG. 3, ideally the mortise pockets are illustrated as not penetrating the entire thickness of the rear upper panel 26 or the top panel 30. In one preferred embodiment, the mortise pocket cutouts penetrate through one side of the thermoplastic composite skin and the honeycomb core, but not through the second side of the thermoplastic composite skin. The length of the extended tenon tabs from the left and right end panels 14 and 18 should approximate the depth of the mortise pockets for preferred nesting of the interlocking joint. This type of joint is referred to as a "blind joint" since the joining method cannot be seen after the joint is engaged. In an alternate embodiment, the mortise pockets may penetrate the entire thickness of the composite panel.

Rather than defining a blind joint, the mortise pocket may penetrate through the entire thickness of the mortise panel. In this construction, the load path through the joint extends through both the upper and lower skins of the mortise panel since both skins are in contact with the tenon. This provides a stronger, larger load carrying capacity joint, especially if no adhesive is used at the joint.

Right and left metallic formed angle brackets 38 and 40 secure the top panel 30 to the right and left end panels 14 and 18, as shown in FIG. 1. The top and end flanges of the brackets 38 and 40 are through-bolted, respectively, to the top panel 30 of the bin and the end panels 14 and 18 such that the brackets provide a load path for downloads imposed on the bottom panel 12, locking the box together so that the tenon tabs cannot be pulled out of the mortise pockets. In this preferred embodiment, only these two brackets 38 and 40 are required to hold the one piece stowage bin together. This is a substantial reduction in part count as well as weight savings providing substantial advantages over alternatives in the prior art.

This folded one piece composite panel stowage bin 10 has the added advantage of not requiring a bonding adhesive. The use of adhesive bonding of joints has virtually always been necessary in aerospace joinery techniques that utilize composite materials. The removal of bonding adhesive for securing joints eliminates substantial application and cure time of the adhesive, generally on the order of eight hours. It can also eliminate the need for expensive and complicating tooling. Thus, both time and money can be saved in the production of a stowage bin 10 that does not require adhesive for securing its joints.

Figure 7:
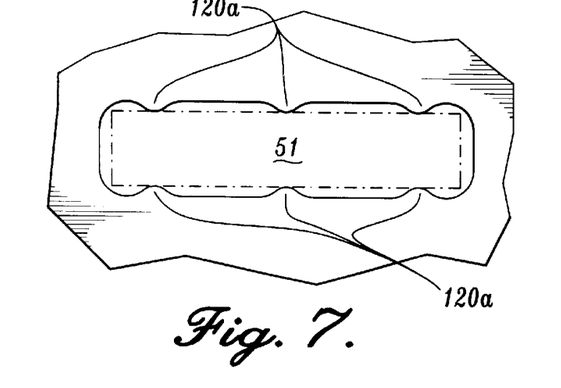
FIG. 7 illustrates an enlarged fragmentary top view of the preferred embodiment as shown in FIG. 2 showing a minimum edge margin mortise and tenon joint with self-aligning wave-shaped protrusions creating an interference fit with an inserted tenon tab (shown in phantom)

Another aspect of the present invention is shown in FIG. 7, which illustrates the utilization of self-tooling characteristics into the mortise and tenon joint. Due to limitations in tolerance control in composite sandwich panel formation, the right and left square cut tenon tabs 51, 52, 53, 54, 57, 58, 59, and 60 are produced substantially smaller than their corresponding right and left mortise pocket counterparts 63, 64, 65, 66, 71, 72, 73, and 74. This methodology helps to ensure that variation in tenon panel thickness does not prevent the tenon tabs from being able to engage in the mortise pockets. The residual gapping which results between the mortise pocket sidewalls and the tenon tab surfaces is unwanted however, because the resulting joint is insecure and requires some type of additional fastening technique. It is also difficult to achieve acceptable final part tolerance specification levels with large variations designed into the joining processes.

The present invention incorporates protrusions 120*a* into the sidewalls and endwalls of the mortise pockets 63, 64, 65, 66, 71, 72, 73, and 74 that extend into the interior of the mortise pockets. These protrusions are illustrated in FIG. 7 as being of wave-like or generally semi-circular shape, and are sized to form an interference fit with the tenon tabs when they engage into their respective mortise pockets. The interference fit is achieved through a combination of spring deflection of the wave-like protrusions by the tenon tabs and local material removal from the tips of the "waves" as the tenons are inserted.

In the preferred embodiment, as shown in FIG. 7, the wave-like protrusions are disposed along both longitudinal sidewalls of the mortise pockets to secure the tenon tab in the center of the mortise pocket. In an alternative embodiment, the wave like protrusions could be disposed only along one longitudinal sidewall so that the opposite longitudinal sidewall would be forced into substantially full contact with the adjacent surface of the extended tenon tab, for use in specific applications. The wave-like protrusions act as self-tooling component of the joint, that is capable of independently securing the tenon panel to the mortise panel, without the assistance of expensive additional tooling.

Figure 8:
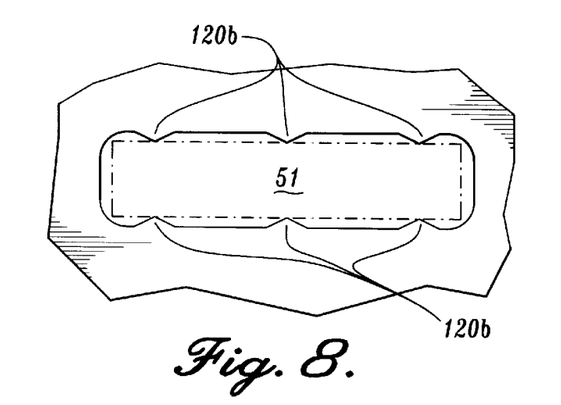
FIGS. 8 and 9 are enlarged, fragmentary top views of other preferred embodiments of the present invention illustrating shapes of the mortise protrusions.
Figure 9:
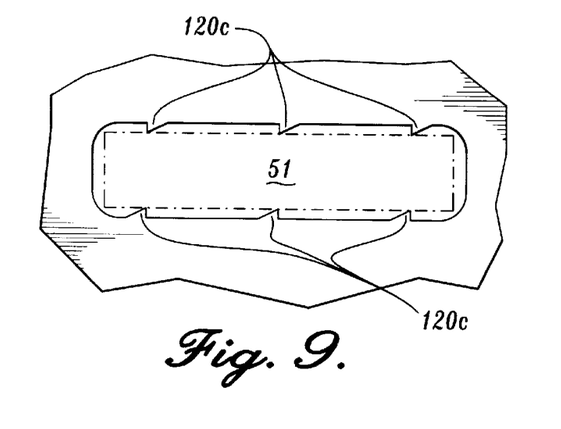

It will be appreciated that the protrusions 120*a* may be formed in shapes other than as illustrated and described above. For instance, the protrusions can be in the shape of peaks, truncated peaks, triangles, truncated triangles, saw teeth, truncated saw teeth, etc. See FIGS. 8 and 9, and protrusions 120*b* and 120*c* respectively in this regard. Ideally, but not essentially, the protrusions are tapered in the direction into the interior of the mortise pockets.

Figure 4:
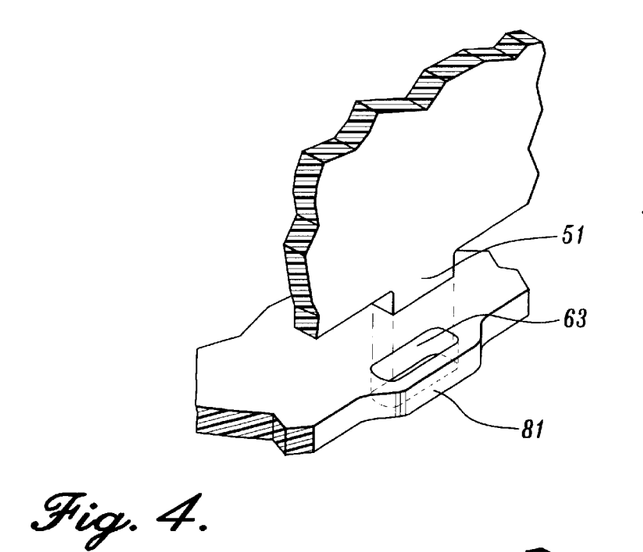
FIG. 4 illustrates an enlarged, fragmentary, exploded perspective view of the preferred embodiment of FIG. 2 showing a minimum edge margin mortise and tenon joint.
Figure 5:
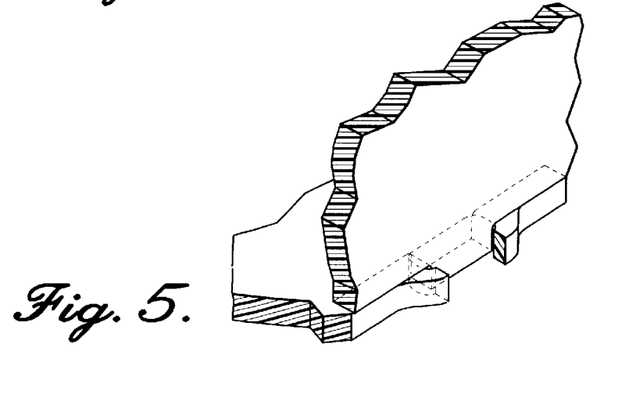
FIG. 5 illustrates an enlarged, fragmentary perspective view of the preferred embodiment of FIG. 2 showing a minimum edge margin mortise panel.
Figure 6:
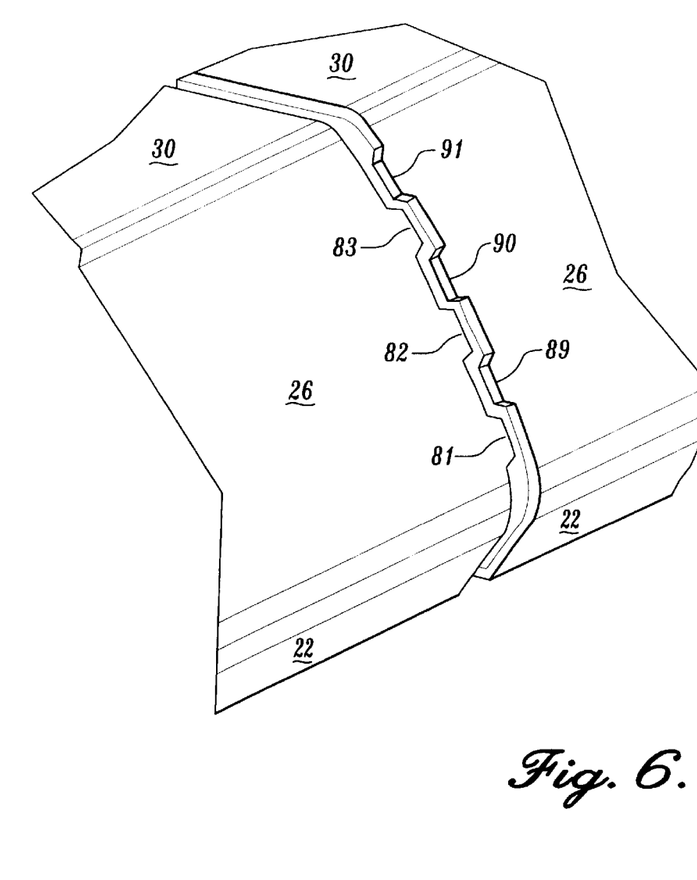
FIG. 6 illustrates an enlarged perspective view of two units of the preferred embodiment of FIG. 1, demonstrating the staggered interlocking effect of the minimum edge margin mortise pocket.

It will also be appreciated that the mortise pocket can be formed in shapes other than the rectangular shape shown in FIGS. 4, 5, and 7. For instance, the mortise pocket can be square, oval, round, etc. In these circumstances, the tenon is shaped to snugly engage the mortise pocket.

It will further be appreciated that the present invention may be utilized in conjunction with mortise and tenon panels that are disposed at angles other than orthogonally to each other, as shown in FIGS. 4 and 5. For example, applicants anticipate that the mortise and tenon joint of the present invention may be utilized with mortise and tenon panels that are disposed anywhere from 45° to 135° relative to each other. In these situations, the mortise pocket is formed in the desired angle relative to the surface of the mortise panel. Also, the edge of the tenon panel adjacent the tenon tab is angled accordingly.

The present invention has been described in relation to a preferred embodiment and several alternate embodiments. One of ordinary skill after reading the foregoing specifications, may be able to effect various other changes, alterations, and substitutions or equivalents without departing from the broad concepts disclosed. It is therefore intended that the scope of the letters patent granted hereon be limited only by the definitions contained in the appended claims and the equivalents thereof.

The embodiments of the invention in which an exclusive property or privilege is claimed are defined as follows:

1. A one-piece storage bin, comprising:
    a single sheet of material, folded into an open-front, box-type structure comprising a bottom panel, right and left end panels, at least one rear panel and a top panel, the right and left end panels folded relative to the sides of a panel selected from the group consisting of the bottom panel, the at least one rear panel and the top panel, thereby forming the end panels of the box-type structure, the panel of the group that the end panels are folded relative to being designated as the integral panel and the other two panels of the group being designated as the joined panels;
    the at least one rear panel folded upwardly from the bottom panel, and the top panel extending forwardly from the top of the at least one rear panel;

the left and right end panels having edge margins and the joined panels having edge margins adjacent the edge margins of the end panels;

a plurality of mortise pockets spaced along either the edge margins of the right and left end panels or the edge margins of the joined panels, and bulges extending outwardly from the mortise pockets toward the edge margins to maintain a minimum width edge margin along each mortise pocket; and tenon tabs extending from the edge margins of the other of the left and right hand end panels and the joined panels to engage within a corresponding mortise pocket to form an interlocking mortise and tenon joint therewith;

wherein the stowage bin comprises formed angle brackets, said brackets being attached to the top panel and the end panels, whereby providing a load path for downloads on the bottom panel and locking the stowage bin together.

2. A structure according to claim 1, wherein formed angle brackets substantially maintain the stowage bin position independently.

3. A one-piece storage bin, comprising:

a single sheet of material, folded into an open-front, box-type structure comprising a bottom panel, right and left end panels, at least one rear panel and a top panel, the right and left end panels folded relative to the sides of a panel selected from the group consisting of the bottom panel, the at least one rear panel and the top panel, thereby forming the end panels of the box-type structure, the panel of the group that the end panels are folded relative to being designated as the integral panel and the other two panels of the group being designated as the joined panels;

the at least one rear panel folded upwardly from the bottom panel, and the top panel extending forwardly from the top of the at least one rear panel;

the left and right end panels having edge margins and the joined panels having edge margins adjacent the edge margins of the end panels;

a plurality of mortise pockets spaced along either the edge margins of the right and left end panels or the edge margins of the joined panels, and bulges extending outwardly from the mortise pockets toward the edge margins to maintain a minimum width edge margin along each mortise pocket; and tenon tabs extending from the edge margins of the other of the left and right hand end panels and the joined panels to engage within a corresponding mortise pocket to form an interlocking mortise and tenon joint therewith;

wherein the panel is comprised of a thermoplastic-composite-skinned, honeycomb-cored sandwich material.

4. A structure according to claim 3, wherein the thermoplastic composite skin of the honeycomb-cored sandwich material panel remains uncut in its post-folded state, whereby the skin is capable of carrying a portion of the load path.

5. A structure according to claim 3, wherein the mortise pockets are located only on the edge margins of the joined panels and the tenon tabs are located only along the corresponding edge margins of the end panels, whereby the load path in the lateral direction is carried through the minimum width edge margin surrounding each mortise pocket.

6. A structure according to claim 3, wherein the protrusions created by the edge margin bulges are only in the side to side directions relative to the one piece storage bin.

7. A one-piece storage bin, comprising:

a single sheet of material, folded into an open-front, box-type structure comprising a bottom panel, right and left end panels, at least one rear panel and a top panel, the right and left end panels folded relative to the sides of a panel selected from the group consisting of the bottom panel, the at least one rear panel and the top panel, thereby forming the end panels of the box-type structure, the panel of the group that the end panels are folded relative to being designated as the integral panel and the other two panels of the group being designated as the joined panels;

the at least one rear panel folded upwardly from the bottom panel, and the top panel extending forwardly from the top of the at least one rear panel;

the left and right end panels having edge margins and the joined panels having edge margins adjacent the edge margins of the end panels;

a plurality of mortise pockets spaced along either the edge margins of the right and left end panels or the edge margins of the joined panels, and bulges extending outwardly from the mortise pockets toward the edge margins to maintain a minimum width edge margin along each mortise pocket; and tenon tabs extending from the edge margins of the other of the left and right hand end panels and the joined panels to engage within a corresponding mortise pocket to form an interlocking mortise and tenon joint therewith;

wherein a plurality of protrusions are positioned along the sidewalls of at least one mortise pocket, and extend from the sidewalls of the mortise pocket into the interior of the mortise pocket, said protrusions sized to form an interference fit with a tenon tab engaged into the mortise pocket through a combination of local material removal and spring deflection of the protrusions by the tenon tab, said protrusions acting as self-tooling features, capable of independently securing the tenon panel to the mortise panel, whereby the tenon panel is positioned and maintained generally in the center of the mortise pocket.

8. A structure according to claim 7, wherein the protrusions are tapered in the direction into the interior of the pocket.

9. A structure according to claim 8, wherein the shape of the protrusions is selected from the group consisting of waves, truncated waves, peaks, truncated peaks, saw teeth, truncated saw teeth, semicircles, truncated semicircles, triangles, and truncated triangles.

10. A one-piece storage bin, comprising:

a single sheet of material, folded into an open-front box-type, structure comprising a bottom panel, right and left end panels, at least one rear panel and a top panel, the right and left end panels folded relative to the sides of a panel selected from the group consisting of the bottom panel, the at least one rear panel and the top panel, thereby forming the end panels of the box-type structure, the panel of the group that the end panels are folded relative to being designated as the integral panel and the other two panels of the group being designated as the joined panels;

the at least one rear panel folded upwardly from the bottom panel, and the top panel extending forwardly from the top of the at least one rear panel;

the left and right end panels having edge margins and the joined panels having edge margins adjacent the edge margins of the end panels;

a plurality of mortise pockets spaced along either the edge margins of the right and left end panels or the edge margins of the joined panels, and bulges extending outwardly from the mortise pockets toward the edge margins to maintain a minimum width edge margin along each mortise pocket; and tenon tabs extending from the edge margins of the other of the left and right hand end panels and the joined panels to engage within a corresponding mortise pocket to form an interlocking mortise and tenon joint therewith;

wherein the stowage bin's side to side mortise and tenon locations are staggered relative to each other, whereby permitting the stowage bin to nest together with another identical stowage bin and have a minimum amount of space required between the bins.

* * * * *

UNITED STATES PATENT AND TRADEMARK OFFICE
CERTIFICATE OF CORRECTION

PATENT NO. : 6,164,477
DATED : December 26, 2000
INVENTOR(S) : R.D. Druckman et al.

It is certified that error appears in the above-identified patent and that said Letters Patent is hereby corrected as shown below:

Column 10,
Line 64, (claim 10, line 3) "box-type, structure" should read -- box-type structure --

Signed and Sealed this

Twenty-third Day of October, 2001

Attest:

NICHOLAS P. GODICI
Acting Director of the United States Patent and Trademark Office Attesting Officer